Figure 1:
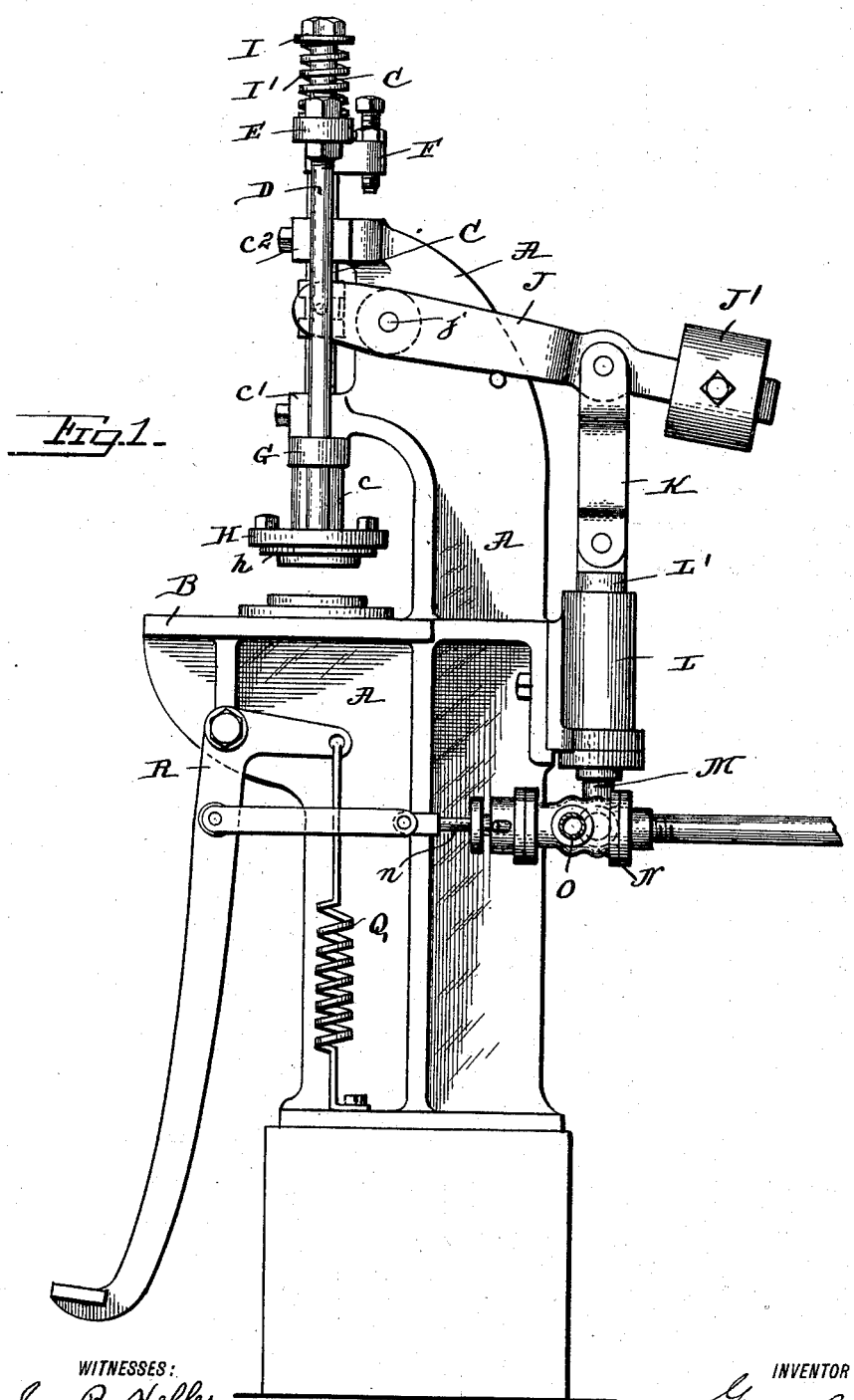

No. 608,204. Patented Aug. 2, 1898.
G. B. LAMB.
GLASS PRESS.
(Application filed Dec. 6, 1897.)
(No Model.) 3 Sheets—Sheet 1.

No. 608,204. Patented Aug. 2, 1898.
G. B. LAMB.
GLASS PRESS.
(Application filed Dec. 6, 1897.)

(No Model.) 3 Sheets—Sheet 2.

WITNESSES:
Jesse B. Heller.
M. H. Ellis.

INVENTOR
George B. Lamb
BY
Harding & Harding
ATTORNEYS

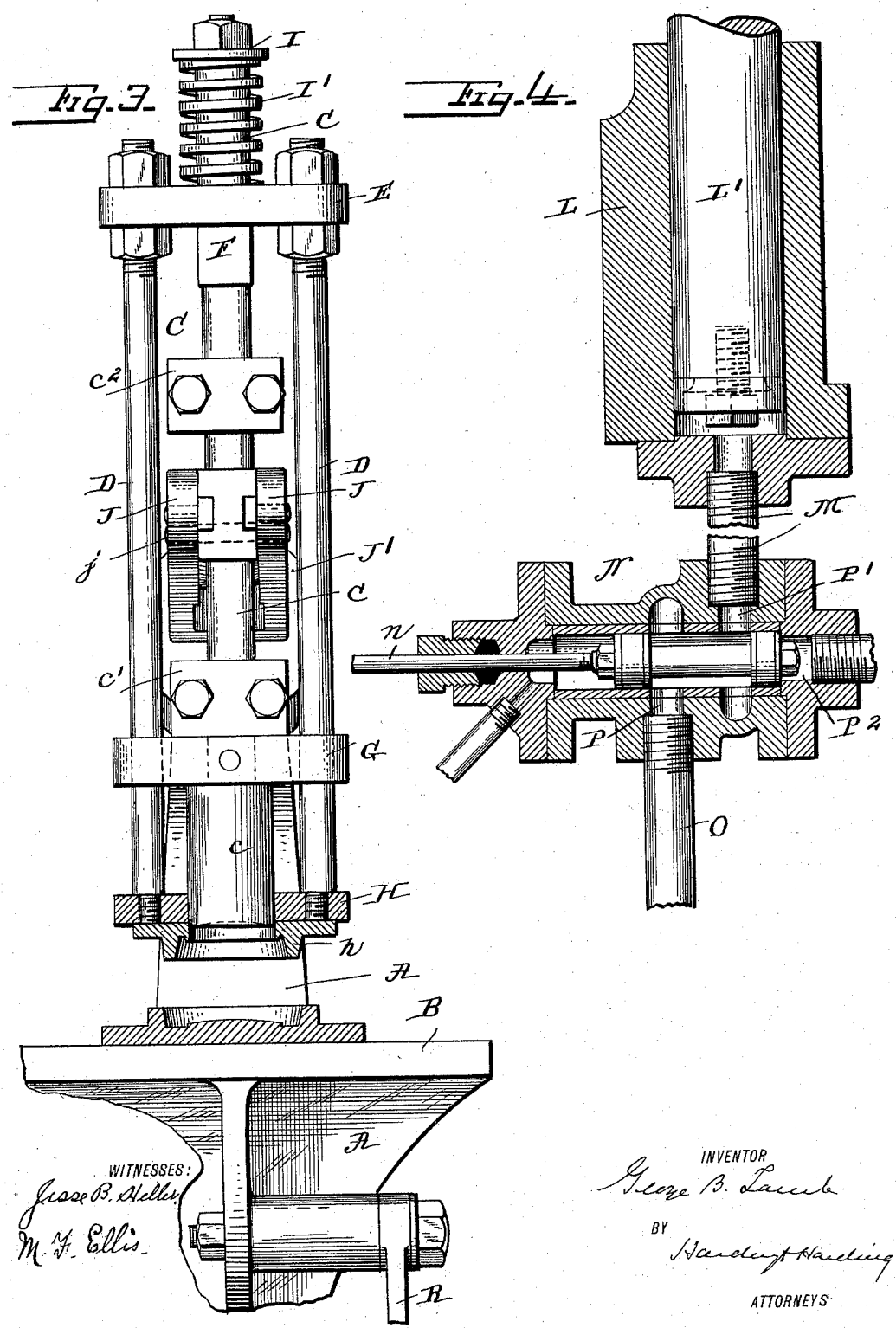

United States Patent Office.

GEORGE B. LAMB, OF WATERBURY, CONNECTICUT, ASSIGNOR TO THE HERO FRUIT JAR COMPANY, OF PHILADELPHIA, PENNSYLVANIA.

GLASS-PRESS.

SPECIFICATION forming part of Letters Patent No. 608,204, dated August 2, 1898.

Application filed December 6, 1897. Serial No. 660,833. (No model.)

*To all whom it may concern:*

Be it known that I, GEORGE B. LAMB, a citizen of the United States, residing at Waterbury, county of New Haven, and State of Connecticut, have invented a new and useful Improvement in Glass-Presses, of which the following is a full, clear, and exact description, reference being had to the accompanying drawings, which form a part of this specification.

My invention relates to presses for molding glass, and has for its object, broadly, the application of power, and particularly the application of hydraulic or pneumatic power, to operate the movable part of the mold.

Presses for molding glass consist usually of a table or platform, upon which the female die is placed, a framework over the table sustaining a vertically-reciprocating plunger and follower in alinement with the female die, the plunger carrying the male die. This plunger and follower has secured to it a lever, which is operated by the workman to depress the plunger and follower. The workman must exercise care to regulate the extent of depression of the press in accordance with the thickness of the plastic glass in the mold—that is, the degree or extent of depression should vary with the thickness of the glass—and therefore this process of hand operation must necessarily be conducted by skilled workmen.

The specific object of my present invention is to devise a machine in which the frame carrying the movable part of the mold will be forced toward the fixed part of the mold to an extent proportionate to the amount of glass in the mold. I will describe an embodiment of my invention wherein hydraulic power is utilized, and the apparatus so embodying my invention consists generally of a plunger working in a hydraulic cylinder and connected with actuating mechanism for depressing the die, the hydraulic cylinder having pipe connection with a hydraulic accumulator, there being a valve interposed between the accumulator and the hydraulic cylinder for admitting and cutting off the pressure liquid, and means under the control of the operator for actuating the valve. In this machine the pressure by means of which the plunger and follower are depressed is constant, and the downward movement thereof proceeds until a certain definite resistance is encountered, when the press stops, even though the connection to the operating-cylinder from the accumulator be open. Not only will the machine do better and more uniform work than the hand-press, but the waste incident to the use of the latter is avoided, and an unskilled, and hence cheaper, class of labor can be employed to operate the machine.

Figure 2:
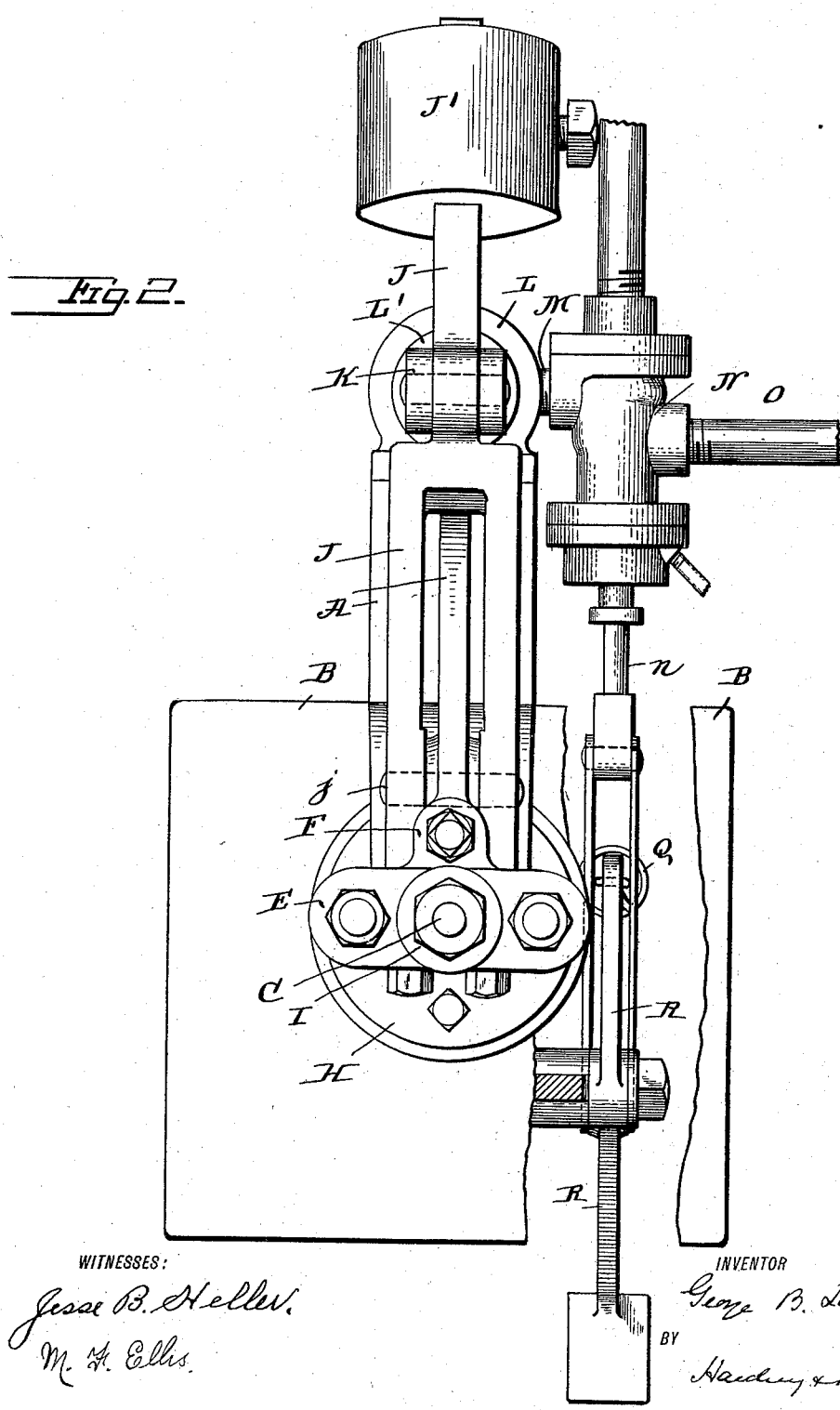

In the drawings, Figure 1 is a side elevation; Fig. 2, a plan view; Fig. 3, a partial front view, and Fig. 4 a detail vertical section through the cylinder and a horizontal section through the valve.

A is the supporting-frame sustaining the cast-iron table B and the bearings $c'$ $c^2$ for the plunger C, carrying the male die $c$. On either side of the plunger are two vertical rods D D, screw-threaded at the top and secured by means of bolts to the cross-piece E, which is orificed, so as to surround the plunger C, and rests upon the lug F, projecting from the plunger. The rods D extend through the orificed cross-piece or guide-plate G, carried by the plunger, and have secured to their lower ends a circular plate H, to which is secured the follower $h$. The plunger is screw-threaded at the top, and a screw-cap I is placed thereon, between which and the cross-piece E is a coiled spring I'.

To the plunger, midway between the two bearings $c'$ $c^2$, is secured one end of the bifurcated lever J, pivoted at $j$ to the frame. Toward its other end this lever is pivoted to one end of the link K, the other end of link K being pivoted to the piston-plunger L', working in the hydraulic cylinder L.

To the lower end of the hydraulic cylinder L extends the pipe M, the other end of the pipe communicating with the port P' of the three-way valve N.

O represents the pipe leading from the accumulator (not shown) to the port P of valve N.

$P^2$ is the exhaust-port at one end of the valve. The valve-rod $n$ extends through the other end of the valve and is pivoted to the bell-crank-operating lever or foot-treadle R, pivoted to the frame A. The short arm of the bell-crank lever R is secured to a spiral spring Q, which normally retains the lever R in such a position that the valve-rod is partially withdrawn from the valve-chamber and the cylinder L is open to the exhaust, in which position the piston-plunger L' will have descended either by its own weight or by reason of a weight J' on the end of lever J and the press will have been lifted.

In the operation of the machine the lower or female die is placed on table B directly underneath the plunger and follower. A piece of plastic glass is placed by the workman on the lower die and the foot-treadle depressed. This forces in the valve-rod, closing the connection between the cylinder and the exhaust and opening the connection between the accumulator and the cylinder. Water under pressure is thus admitted to the hydraulic cylinder, forcing up the piston-plunger and forcing down plunger C, carrying die c. As plunger C descends the frame carrying the follower descends with it by reason of its own weight and by reason of the tension of coiled spring I'. This descending movement of die and follower continues until the follower strikes the female die, when its movement is positively arrested. The follower when in this position limits the spread of the glass and imparts to it its form. The die, however, continues to descend until the glass is squeezed out so as to fill the mold. The extent of downward movement of the plunger is thus dependent upon the thickness of the glass. If the glass is relatively small in quantity, to fill out the mold the finished casting will be relatively thin. If the quantity of glass is relatively large, to fill out the mold the casting will be relatively thick. The power for actuating the plunger being practically constant, the plunger will in the former case descend farther than in the latter case, in each case stopping when it meets a definite resistance—that is, the resistance to internal or molecular compression after it has filled out the mold. After the downward movement of the plunger has ceased the workman releases pressure upon the foot-treadle, and the spring Q, through its bell-and-crank connection with the valve-rod, shifts the valve, so that the hydraulic cylinder is connected with the exhaust, and the piston-plunger in the cylinder is free to descend, which it does either by its own weight or by reason of the weight J', and the plunger C and follower-frame rise until they reach their upper positions.

Having now fully described my invention, what I claim, and desire to protect by Letters Patent, is—

1. In a glass-press, the combination with the device adapted to support the movable part of the mold and reciprocate it toward and from the fixed part of the mold of a lever connected to said moving part and normally tending to hold the movable part in its retracted position, a piston connected to said lever, a cylinder for said piston and connection between the pressure-supply and said cylinder at one side of said piston whereby the movement of the piston by pressure medium operates upon said lever to move the movable part of the mold into operative position.

2. In a glass-press, the combination with the device adapted to support the movable part of the mold and reciprocate it toward and from the fixed part of the mold, of a lever connected to said moving part and normally tending to hold the movable part in its retracted position, a piston connected to said lever, a cylinder for said piston and connection between the pressure-supply and said cylinder at one side of said piston whereby the movement of the piston by pressure medium operates upon said lever to move the movable part of the mold into operative position, and an exhaust for said cylinder at the same side of said piston.

3. In a glass-press, the combination with the device adapted to support the movable part of the mold and reciprocate it toward and from the fixed part of the mold, of a lever connected to said moving part and normally tending to hold the movable part in its retracted position, a piston connected to said lever, a cylinder for said piston and connection between the pressure-supply and said cylinder at one side of said piston whereby the movement of the piston by pressure medium operates upon said lever to move the movable part of the mold into operative position, and an exhaust for said cylinder at the same side of said piston, and a valve adapted in its movement to open the connection from pressure-supply to said cylinder and close the exhaust, and to open the exhaust and close the connection to the pressure-supply.

In testimony of which invention I have hereunto set my hand.

GEORGE B. LAMB.

Witnesses:
J. M. GALLOND,
NELLYE DONAHUE.